US007668779B2

(12) United States Patent
DeWitt et al.

(10) Patent No.: US 7,668,779 B2
(45) Date of Patent: Feb. 23, 2010

(54) METHOD AND SYSTEM FOR TRACKING AND VERIFYING REPAIR ESTIMATES, INVOICES, AND BILLING EXCEPTIONS

(75) Inventors: Richard R. DeWitt, Kenosha, WI (US); Nadia Hermiz Lannie, Arlington Heights, IL (US); James E. Flanagan, Geneva, IL (US); Mary Ann Prozes, Chicago, IL (US)

(73) Assignee: TTX Company, Chicago, IL (US)

( * ) Notice: Subject to any disclaimer, the term of this patent is extended or adjusted under 35 U.S.C. 154(b) by 0 days.

(21) Appl. No.: 11/413,365

(22) Filed: Apr. 28, 2006

(65) Prior Publication Data
US 2006/0287954 A1    Dec. 21, 2006

Related U.S. Application Data

(63) Continuation-in-part of application No. 09/974,551, filed on Oct. 9, 2001, now abandoned.

(51) Int. Cl.
*G06Q 40/00*    (2006.01)
(52) U.S. Cl. .............................. 705/40; 705/35; 705/41; 705/42; 209/3.1; 209/44.1; 209/628; 707/104.1; 707/E17.045
(58) Field of Classification Search ............... 705/1–45; 209/3–629; 701/2–20
See application file for complete search history.

(56) References Cited

U.S. PATENT DOCUMENTS 5,699,528 A    12/1997    Hogan ........................ 395/240

(Continued)

FOREIGN PATENT DOCUMENTS

CA    2173713    12/1996

(Continued)

OTHER PUBLICATIONS

Richard Moore, WIPP Railcar Preventive Maintenance Inspection Procedures, May 2004, pp. 1-29.*

(Continued)

*Primary Examiner*—James P Trammell
*Assistant Examiner*—Marissa Liu
(74) *Attorney, Agent, or Firm*—Brinks Hofer Gilson & Lione

(57) ABSTRACT

A method and system for tracking and verifying estimates, invoices, and billing exceptions for charges billed to a customer by a vendor is disclosed. The vendor submits an estimate via a billing verification system. The system generates an estimate record and facilitates customer review of the estimate. The system also receives an invoice for the completed repair from the vendor and generates an invoice record. Based on the estimate record and the invoice record, the system can perform an audit to compare the invoice to the estimate. The system also enables the customer to review the invoice via the billing verification system to identify billing exceptions associated with any disputed charges. A billing exception record is generated in the billing verification system for each of the billing exceptions. The vendor is then notified of the billing exceptions. The vendor reviews and responds to the billing exception records via the billing verification system. A billing exception response record is generated for each vendor response. The customer is then notified of the reviewed billing exception response records.

20 Claims, 11 Drawing Sheets

U.S. PATENT DOCUMENTS

| | | | | |
|---|---|---|---|---|
| 6,070,150 | A | 5/2000 | Remington et al. | 705/34 |
| 6,078,907 | A | 6/2000 | Lamm | 705/40 |
| 6,128,603 | A | 10/2000 | Dent et al. | 705/40 |
| 6,144,726 | A * | 11/2000 | Cross | 379/114.03 |
| 6,647,328 | B2 * | 11/2003 | Walker | 701/36 |
| 6,647,382 | B1 * | 11/2003 | Saracco | 707/3 |

FOREIGN PATENT DOCUMENTS

| | | |
|---|---|---|
| WO | 94/09439 | 4/1994 |

OTHER PUBLICATIONS

[retrieved on Mar. 5, 2007] Retrieved from the website of Integrated Data Communication Systems, Inc. using Internet <URL: http://www.idcsi.com/IDSCWEB/products.htm.

[retrieved on Mar. 5, 2007] Retrieved from the website of Integrated Data Communication Systems, Inc. using Internet <URL: http://www.idcsi.com/IDSCWEB/clients.htm.

[retrieved on Mar. 5, 2007] Retrieved from the website of Integrated Data Communication Systems, Inc. using Internet <URL: http://www.idcsi.com/IDSCWEB/services.asp.

* cited by examiner

⌐ 502

Home | Menu Selection | Help

⊟ Auditor Review
  ⊞ TTX
⊟ Auditor Released
  ⊟ PXXX
    ⊞ 2001 - January - 1
    ⊞ 2001 - February - 1
  ⊞ TTX
⊟ Railroad Completed
  ⊟ PXXX
    ⊞ DLTR
  ⊞ TTX
⊞ Auditor Processed CBA
⊟ Auditor Closed
  ⊞ TTX

504

Copyright © 2001
TTX Company.
All rights reserved.

Home | Menu Selection | Help

TTX Exception Review for DELTA RAIL CO.

602   HEADER

| Bill Number | DR0054698 |
|---|---|
| Account Date | 2001 - February |
| Recieved Date | 2/27/2001 |
| Total Bill Amount | $3,711,158.85 |
| Total Exception Amount | $41,293.75 |

[ Release ]
[ Close ] — 608

604   BRC DETAIL SEARCH

Search On:
  ⦿ Car Initial Number
  ◯ Car Number
  [_____] (Optional)
  ◯ Exception Amount
  ◯ SPLC:
  [-- ALL SPLCs --
  123456 - CHICAGO
  123457 - DEERFIELD
  234567 - LONGMONT]

Sort Order:
  ⦿ Ascending
  ⦿ Descending

[ Search ] — 606

Copyright © 2001 TTX Company. All rights reserved.

| Ln | Car Init | Car Num | Kind of Car | Repair Date | Repaired At | Road | Date | Ref Nbr | Acct Dt | Bill Rd |
|---|---|---|---|---|---|---|---|---|---|---|
| 1 | ABOX | 051146 | B - Box | 2/1/2001 | 123456 - CHICAGO | | | 711284 | 2001 - 02 | DTLR |

| Ln | Attch | Lc | Qty | C | AJob QF | Description | MO YR MF C AS AF RS RF | WM | RJob QF | R | Net Chg |
|---|---|---|---|---|---|---|---|---|---|---|---|
| 2 | NONE | | 1 | 7 | 1143 00 | SINGLE CAR ABT, W/O BRAKE CYL TA | | 21 | 1143 00 | 1 | $67.24 |
| 3 | NONE | | 1 | 3 | 1301 00 | ABDWEMERG. PORT. CLEANED &/OR R | | 12 | 1301 00 | 1 | $202.76 |
| 4 | NONE | | 6 | 1 | 1840 00 | BRAKE SHOE-COMP, HI-FRCT 2 IN. | | 01 | 1840 00 | 1 | $62.20 |
| 5 | NONE | | 1 | 1 | 1852 00 | BRAKE SHOE KEY | | 01 | 1852 00 | 1 | $7.23 |
| 6 | NONE | B | 1 | 1 | 2161 00 | CARRIER WEAR PLT /STRIKER SHIM ( | | 01 | 2161 00 | 1 | $26.53 |
| 7 | Mat Dup Oth | A | 1 | 1 | 4458 00 | LABOR, JACK CAR | | 09 | 4458 00 | 1 | $57.24 |
| 8 | NONE | | 1 | 1 | 4626 QY | STENCIL, CONSOLIDATED-PER SIDE | | 22 | 4624 QY | 1 | $38.46 |
| | | | | | | | Total Charge | | | | $481.76 |

| Ln | Attach | Exception Message | Excp Amt | RR Action |
|---|---|---|---|---|
| 7 | Mat Dup Oth | No justification to jack car. | $57.24 | NOT PROCESSED |
| | | Comments: | | |

|< << BRC 2 of 331 >> >|

Copyright © 2001 TTX Company. All rights reserved.

Exception Document Attachment

Attachment Files
  DTLR
    051146_0000124965000002.PDF

| | |
|---|---|
| Billing Road | DTLR |
| Owner Initial | TTX |
| Account Date | 2001 - February |
| Billing Road Suffix | 1 |
| Car Initial | ABOX |
| Car Number | 051146 |
| SPLC | 123456 |
| Repair Date | 2/1/2001 |
| Line Number | 7 |
| Path: | |

[ Back ] [ Attach ]

Copyright © 2001 TTX Company. All rights reserved.

Fig.10

Home | Menu Selection | Help

☐ Railroad Monthly Audits
 ☐ AXXX
 ☐ DTLR
  ☐ PXXX
  ☐ TTX
   ☐ 2001 - March
   ☐ 2001 - April
   ☐ 2001 - May Copyright © 2001 TTX Company. All rights reserved.

Home | Menu Selection | Help

DELTA RAIL CO. - Exception Letter from TTX

1102 — HEADER

| Bill Number | DTL056901 |
|---|---|
| Control Number (CBA) | 45652V |
| Account Date | 2001 - March |
| Received Date | 2/27/2001 |
| Total Bill Amount | $3,334,450.23 |
| Total Exception Amount | $146,211.39 |
| Total CBA Amount | $566.21 |

Update CBA — 1110
Status Rpt — 1112
Completed — 1114

1106 — BRC DETAIL SEARCH

BRC status:
All BRCs
Completed
Field Completed
In Process

Search On:
⦿ Car Number
  ☐ (Optional)
○ Car Initial Number
○ Exception Amount
○ SPLC:

-- ALL SPLCs --
123456 - CHICAGO
123457 - DEERFIELD
234567 - LONGMONT

Sort Order:
⦿ Ascending
○ Descending

Search — 1108

Copyright © 2001 TTX Company. All rights reserved.

| SPLC Location | Total # of BRCs Excp | Completed | Field Completed | In Progress | Allow | DisAllow | Partial | CBA Amt |
|---|---|---|---|---|---|---|---|---|
| 123456 - CHICAGO | 12 | 0 | 0 | 12 | $0.00 | $0.00 | $0.00 | $0.00 |
| 234567 - DEERFIELD | 9 | 0 | 0 | 9 | $57.24 | $0.00 | $0.00 | $57.24 |
| 456789 - LONGMONT | 12 | 0 | 0 | 12 | $0.00 | $0.00 | $0.00 | $0.00 |
| 567890 - BANGOR | 4 | 0 | 0 | 4 | $0.00 | $0.00 | $0.00 | $0.00 |
| 678901 - TRAVERSE CITY | 1 | 0 | 0 | 1 | $0.00 | $0.00 | $0.00 | $0.00 |
| 893654 - DETROIT | 5 | 5 | 0 | 0 | $168.63 | $736.24 | $150.00 | $318.63 |
| TOTALS | 43 | 5 | 0 | 38 | $225.87 | $736.24 | $150.00 | $375.87 |

METHOD AND SYSTEM FOR TRACKING AND VERIFYING REPAIR ESTIMATES, INVOICES, AND BILLING EXCEPTIONS

RELATED APPLICATIONS

This application is a continuation-in-part of U.S. patent application Ser. No. 09/974,551, entitled "Method And System For Tracking And Verifying Billing Exceptions," filed on Oct. 9, 2001 now abandoned, which is incorporated by reference into this document in its entirety.

BACKGROUND OF THE INVENTION

The present invention relates to repair estimates, invoices, and billing exceptions. In particular, this invention relates to methods and systems for tracking and verifying repair estimates, invoices, and billing exceptions for repairs performed by a vendor for a customer. Although it is applicable to a wide variety of industries, the invention will be described with a particular emphasis on repairs to railcars and equipment in the railroad industry.

The railroad network in the United States includes a number of railroad systems that are owned by different companies. Together, these systems comprise a complete railroad network that connects locations across the nation. Although some railroad companies also own their own railcars, many railcars are owned by other companies that do not own any part of the railroad network itself. To move from one location to another, therefore, one company's railcars frequently need to travel over another company's railroad system.

Repair facilities are positioned at various locations throughout the railroad network. These facilities are available to perform any necessary repairs to railcars in the area. The repair facilities are owned and operated by various railroad companies and independent repair contractors. When a railcar repair becomes necessary, it typically is performed at the nearest repair facility. Under limited authority granted by the Association of American Railroads (AAR) Interchange Rules, the owner of the repair facility acts as a repair agent for the owner of the railcar needing repair. In this way, the owner of a given repair facility may act as a repair agent for a number of different railcar owners. Likewise, a given owner's railcars may be repaired by a number of different repair agents as those railcars travel the railroad network. In these situations, the repair agent is a vendor of services provided to its customer, the railcar owner.

Like many other types of vendors, repair agents may bill railcar owners for repair services by repair event or on a monthly basis. The billing process varies, depending largely on whether the repair facility is owned by a railroad or an independent repair contractor. Independent repair facilities typically bill by repair event.

Billing for railcar repairs performed by railroad-owned repair facilities is generally governed by the AAR Interchange Rules. Under the AAR Interchange Rules, railroad-owned repair facilities typically bill on a monthly basis. A typical monthly bill may include charges for all repairs performed on the owner's railcars at all of the repair agent's facilities. According to these rules, it generally is not necessary for the repair agent to provide an estimate before performing a repair. Instead, the AAR Interchange Rules provide standardized rates for various types of repairs. After a repair facility performs repairs in accordance with the AAR Interchange Rules, a billing repair card is included for each repair. Each billing repair card indicates, among other things, the date of repair, the railcar number, the type of car, the repair location, and a description and cost of the repair, including parts and labor.

If not governed directly by the AAR Interchange Rules (e.g., if the repair is performed by an independent repair contractor), then the cost of repair may be governed by one or more repair agreements between the repair agent and the railcar owner. Typically, a repair agent is required to provide an estimate before performing a repair. According to existing practices, the repair agent prepares the estimate and then sends it to the railcar owner for review. The railcar owner then has an opportunity to approve/authorize, reject, or take exceptions to the repair estimate. The railcar owner also may negotiate with the repair agent regarding the terms of the repair, including the repair fee.

In some instances, a railcar owner may wish to dispute charges billed by a repair agent. For example, the repair agent may have charged the wrong railcar owner, charged more than is allowed by the AAR Interchange Rules or the applicable repair agreement, or failed to justify the charge for a given repair. These situations may be governed by the AAR Interchange Rules or the applicable repair agreement. In these cases, the railcar owner generates an exception to the repair bill, explaining the reasons for disputing the particular repair charges. According to existing practices, the railcar owner prepares an exception packet, which includes an exception letter, copies of the billing repair cards for which exceptions are taken, and any necessary supporting documentation. The railcar owner indicates the reasons for the exceptions on the billing repair cards. The owner sends the entire exception packet to the repair agent. The repair agent reviews the exception packet and approves or disapproves each exception.

For each exception approved or accepted by a repair agent subject to the AAR Interchange Rules, the appropriate repair charges are credited to the railcar owner's account or counter-billed to the repair agent by the railcar owner. For exceptions approved or accepted by independent repair agents, the agent typically generates a new invoice that reflects the adjusted repair fee. In some cases, the repair agent may approve only a portion of an exception, in which case only a portion of the repair charges are credited or adjusted.

The existing system for processing repair estimates, invoices, and exceptions is inefficient and paper-intensive. The railcar owner must wait to receive an estimate, review the estimate, and then communicate its approval or rejection of the estimate to the repair agent. If the estimate is rejected initially, there may be a negotiation between the railcar owner and the repair agent, potentially involving several rounds of communication, before the railcar owner approves a final repair estimate.

The railcar owner also must wait to receive an invoice from the repair agent after a repair is completed. The railcar owner may then review and audit the invoice to ensure that it matches the estimate agreed upon with the repair agent. If there are discrepancies between the estimate and the invoice, then the railcar owner must generate an exception to the invoice and send the exception to the repair agent.

The railcar owner then must wait to receive an exception approval from the repair agent before its account is credited or the invoice is adjusted. The repair agent, however, must investigate the repair to which an exception is taken to determine whether the charges are appropriate. In many cases, a manager of the repair agent separates the billing repair cards according to the facility that performed the repairs. The manager then distributes the billing repair cards to field representatives at the various repair facilities for their comments. Once the manager receives comments from all of the field representatives, the manager makes a final decision to approve, disapprove, or partially approve each exception. The manager then sends these responses to the railcar owner. This process typically requires months to complete. Moreover, the shipping and handling associated with all of this correspondence is expensive for both the repair agent and the railcar owner. Accordingly, there is a need for a more efficient and less expensive method and system for tracking and processing billing exceptions.

It is, therefore, an object of the present invention to provide an improved method and system for efficiently tracking and verifying repair estimate, invoices, and billing exceptions for repairs performed for a customer by a vendor. It is another object of the present invention to provide an improved method and system for efficiently tracking and verifying repair estimates, invoices, and billing exceptions for charges billed by a repair agent to an equipment owner, preferably in a manner that complies with the AAR Interchange Rules. It is another object of the present invention to provide railcar owners and their agents with a single integrated system for tracking and verifying billing data for repairs performed by both railroad-owned repair facilities and independent repair facilities.

BRIEF SUMMARY OF THE PREFERRED EMBODIMENTS

In accordance with the present invention, a method and system are described for tracking and verifying estimates, invoices, and billing exceptions related to repairs performed by a vendor for a customer.

According to one aspect of the present invention, there is provided a system for tracking and verifying charges billed to a railcar owner by a plurality of railcar repair facilities, including a plurality of railroad-owned railcar repair facilities and a plurality of independent railcar repair facilities. A server is configured to receive billing data received from the plurality of railcar repair facilities. A database is in communication with the server and configured to store the billing data. A railroad-owned repair facility interface is configured to provide communication between the server and the plurality of railroad-owned repair facilities. An independent repair facility interface is configured to provide communication between the server and the plurality of independent repair facilities. A railcar owner interface is configured to provide communication between the server and a plurality of railcar owners. The railcar owner interface is further configured to provide railcar owners with access to billing data received both from the railroad-owned repair facilities and from the independent repair facilities According to another aspect of the present invention, there is provided a method of tracking and verifying estimates and invoices for repairs performed by a vendor for a customer. A set of estimate data related to a proposed repair is received from the vendor via a billing verification system. An estimate record is generated record based on the estimate data. A set of invoice data related to a completed repair is received from the vendor via the billing verification system. An invoice record is generated based on the invoice data. The invoice record is audited with respect to the estimate record via the billing verification system. The customer is notified if the invoice record does not match the estimate record.

Other methods, apparatus, systems, features, and advantages of the invention will be, or will become, apparent to one with skill in the art upon examination of the following figures and detailed description. It is intended that all such additional systems, methods, features and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

FIG. 7 shows a railcar owner menu screen display from an equipment owner graphical user interface of a billing verification system according to another presently preferred embodiment of the invention;

FIG. 8 shows a billing exception header screen display from the equipment owner graphical user interface;

FIG. 9 shows a billing exception record screen display from the equipment owner graphical user interface;

FIG. 10 shows an exception document attachment screen display from the equipment owner graphical user interface;

FIG. 12 shows a repair agent menu screen display from a repair agent graphical user interface of a billing verification system according to another presently preferred embodiment of the invention;

FIG. 13 shows a billing exception header screen display from the repair agent graphical user interface;

Figures 14, 15:
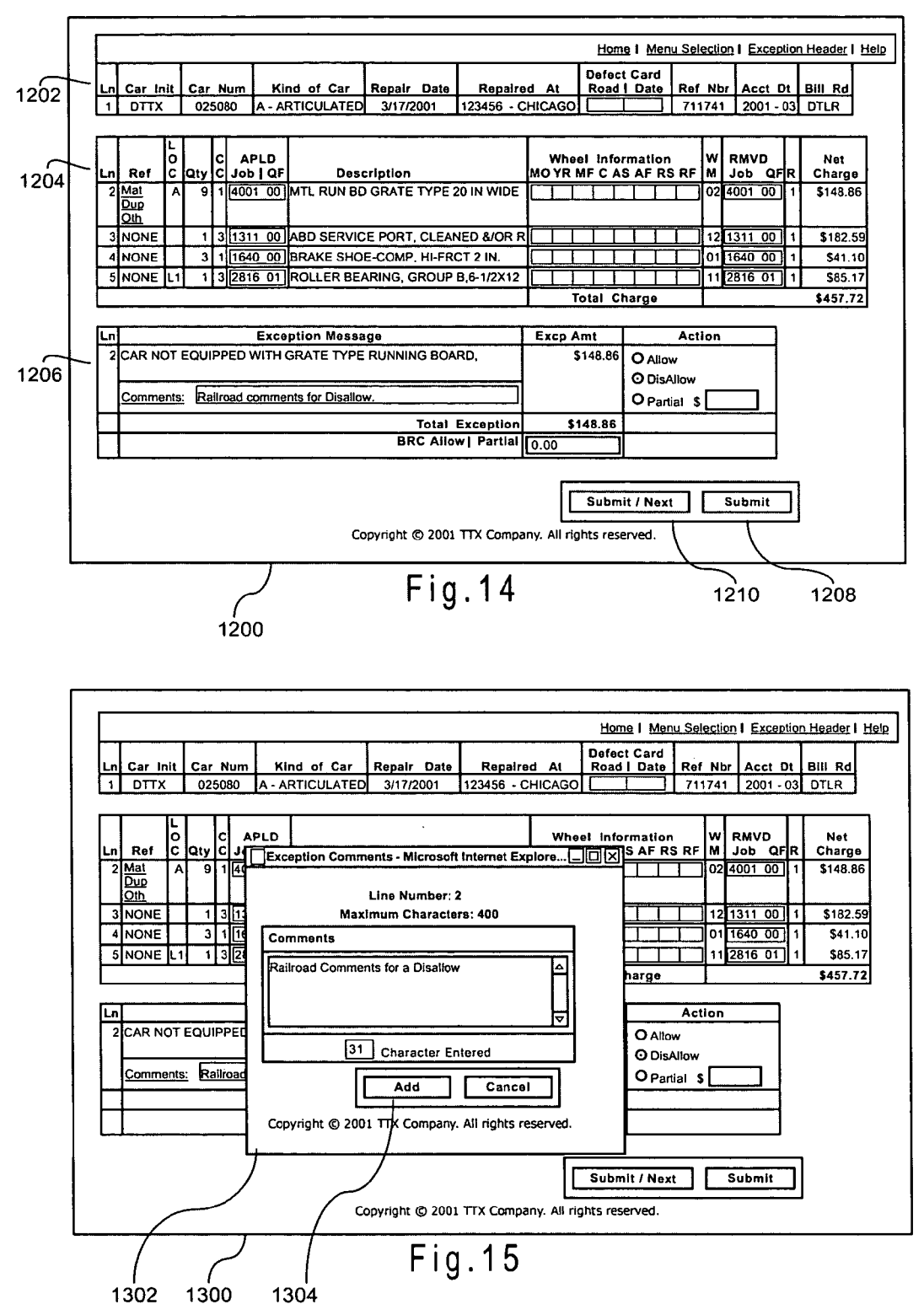

FIG. 14 shows a billing exception response screen display from the repair agent graphical user interface;

FIG. 15 shows a response comment screen display from the repair agent graphical user interface;

DETAILED DESCRIPTION OF THE PREFERRED EMBODIMENTS

Figure 1:
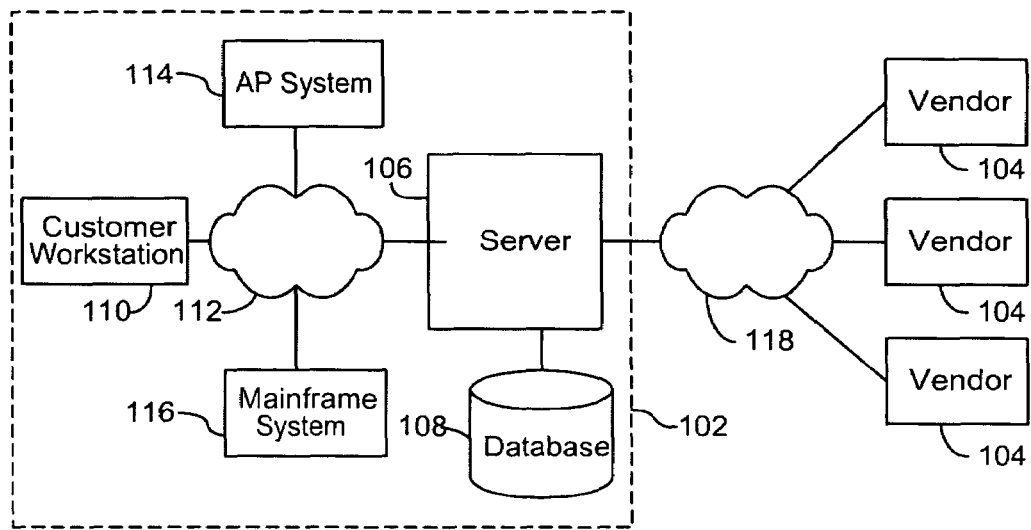
FIG. 1 shows a block diagram depicting a billing verification system according to one presently preferred embodiment of the invention.

Referring now to the accompanying drawings, FIG. 1 shows a block diagram depicting an exemplary billing verification system 100 according to one presently preferred embodiment of the invention. In this embodiment, the billing verification system 100 may be controlled and operated by a customer, represented for purposes of this figure as a dotted block 102. Alternatively, the billing verification system 100 may be controlled a vendor or an independent billing agent. The customer is billed for goods or services by one or more vendors 104 that interface with the system via computer workstations. The system 100 is useful for customers 102 and vendors 104 from a wide variety of industries. For example, the customer 102 may be an equipment owner whose railcars are repaired by one or more repair agents acting as vendors 104.

In the embodiment of FIG. 1, the customer 102 maintains a server 106 and a database 108. The database 108 in the present embodiment contains billing data relating to charges billed by the vendors 104 to the customer 102. The data includes estimate records, invoice records, billing exception records, and billing exception response records, as described more fully below. The billing data is accessible by the customer 102 and, perhaps to a more limited extent, the vendors 104, via the server 106. The billing data, which is based on estimates and invoices sent by the vendors 104 to the customer 102, may be loaded into the database 108 in a number of ways. For instance, a vendor 104 may provide the bill in an electronic file that is uploaded to the server 106, which loads the billing data from the electronic bill file into the database 108. Alternatively, the customer 102 may load the billing data into the billing verification system 100 from a bill received from a vendor 104. The vendor 104 may provide the bill in traditional hardcopy format, or it may provide the bill in an electronic bill file stored on a magnetic tape or other storage media. If the bill is provided in hardcopy format, a customer operator manually enters the billing data into the database 108. In the case of an electronic bill file, the billing data may be automatically transferred from the magnetic tape to the database 108.

Once the billing data is loaded into the database 108, the customer accesses the billing data via a workstation 110 that is connected to the server 106 via a distributed computer network 112, such as an intranet, local area network, or, preferably, the Internet. Alternatively, the customer workstation 110 may be connected directly to the server 106. Access to the server 106 preferably is controlled via an authentication and access control procedure. Through the workstation 110, the customer is able to review estimates and approve or reject estimates, to review and audit invoices, and to generate exceptions, as described more fully below. Preferably, the server 106 generates a customer graphical user interface in the form of custom web pages that provide access to the billing data. These web pages are viewable by the customer via a browser application resident on the customer workstation 110. The server 106 also may communicate with a customer accounts payable system 114, such as an SAP system. In FIG. 1, this communication is illustrated via an internal distributed computer network 112, but the communication also could be via an external network.

Although only one customer workstation 110 is shown in FIG. 1, the system 100 may be accessible to various customer representatives via a number of different workstations 110. For instance, if it is necessary or helpful for customer field representatives in remote locations to review the billing data, they may do so via customer workstations 110 connected to the server 106 via a distributed computer network 112, such as the Internet. In this way, various customer employees are provided convenient and efficient access to the billing data for purposes of expedited review.

As an alternative to loading the billing data directly into the database 108, the customer may first load the billing data into a mainframe accounting system 116. This alternative provides a transition system for customers that have traditionally processed vendor billing data via a mainframe accounting system 116. For instance, the customer 102 may first review the billing data and generate exceptions on the mainframe accounting system 116. The resulting processed data is then loaded into the database for review by the vendors 104. After a transition period, the customer 102 may eliminate the mainframe accounting system 116 and process all billing data via the server 106 and the database 108.

When a vendor 104 submits estimates and invoices, estimate and invoice records are created and eventually stored in the database 108. These records are then released, or made available, to the customer via the server 106. The customer 102 may then review these records by accessing the server 106, for example via the distributed network 112. After reviewing an estimate or invoice, the customer may accept or reject the estimate or invoice or generate one or more billing exceptions.

Likewise, when the customer 102 generates exceptions to billing data, billing exception records are created and eventually stored in the database 108. Once the customer 102 has generated exceptions to billing data provided by a particular vendor, the exceptions are released, or made available, to that vendor via the server 106. The vendor then reviews the relevant billing exception records by accessing the server 106 via an external distributed computer network 118, such as an intranet or preferably the Internet. After reviewing the billing exception records, the vendor may approve or disapprove the exceptions, as described more fully below.

Again, access to the server 106 preferably is controlled via an authentication and access control procedure. The server 106 provides customers 102 and vendors 104 with a graphical user interface, preferably in the form of custom web pages that are viewed via a browser application resident on a workstation. The server 106, restricts both customer and vendor access to only those estimate, invoice, and billing exception records that relate to billing data for that particular customer or vendor. The authentication and access control procedure ensures that one customer is not allowed access to other customers' billing data, and one vendor is not allowed access to other vendors' billing data.

The system depicted in FIG. 1 may be controlled and operated by the single customer 102, but provides access to multiple vendors 104. Each vendor may have a variety of employees that require access to the billing verification system 100. For instance, if it is necessary or helpful for vendor field representatives in remote locations to submit estimates and invoices and to review the billing exceptions in order to confirm or deny their legitimacy, they may do so via computer workstations that connect to the server 106 via a distributed computer network 118, such as the Internet. In this way, various vendor employees are provided convenient and efficient access to the billing data for purposes of expedited review of the billing exceptions.

Figure 2:
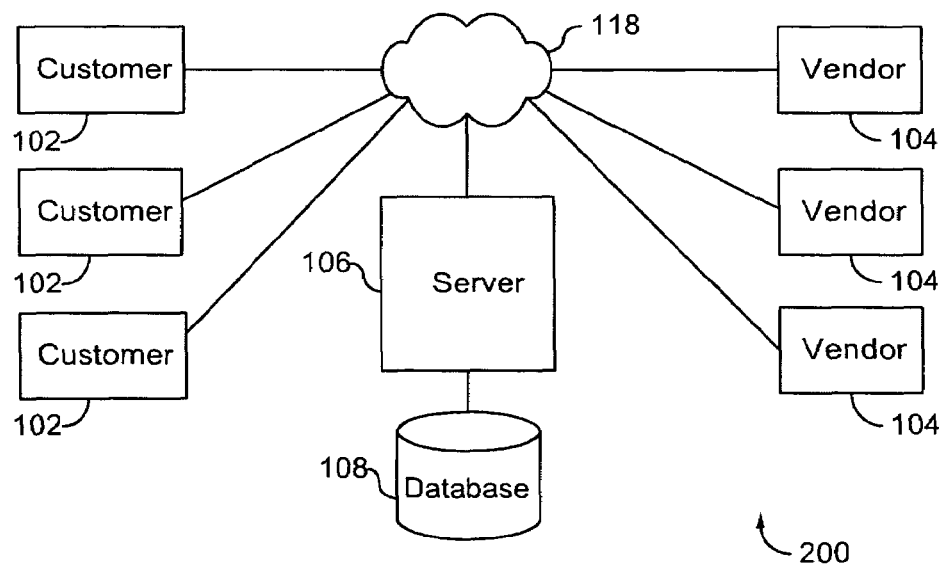
FIG. 2 shows a block diagram depicting a billing verification system according to another presently preferred embodiment of the invention.

The block diagram shown in FIG. 2 depicts an alternative billing verification system 200 according to another presently preferred embodiment of the invention. The billing verification system 200 depicted in FIG. 2 provides billing verification services to a number of different customers 102. In this way, the billing verification system 200 of FIG. 2 may act as an industry-wide clearinghouse for estimates, invoices, and billing exceptions. The billing verification system 200 itself may be controlled and operated by a customer 102 or by a third-party service provider.

Operation of this billing verification system 200 is similar to that of the system 100 shown in FIG. 1. Billing data, including estimates, invoices, and/or billing exceptions, may be uploaded to the database 108 either by a customer 102 or a vendor 104. The customer 102 may then access the billing verification system 200 via a distributed computer network 118, such as the Internet to review the billing data. After reviewing an estimate or invoice record, the customer may accept or reject the estimate or invoice or generate one or more billing exception records through use of the customer graphical user interface. The vendor 104 also accesses the billing verification system 200 via the distributed computer network to review the billing exception records via the vendor graphical user interface.

As described above with respect to the system 100 illustrated in FIG. 1, the authentication and access control procedure restricts customer and vendor access to only the billing data that relates to that customer 102 or vendor 104. Again, multiple employees of both the customers 102 and the vendors 104, perhaps in remote locations, may access the billing verification system through workstations connected to the server 106 via the Internet.

The billing verification systems 100, 200 also may be configured to maintain records regarding the contractual agreements and terms between the customers 102 and the vendors 104. The system 100, 200 may used this information as part of the auditing process to confirm that estimates and invoices reflect the correct labor rates, payment terms, etc.

In addition, the billing verification systems 100, 200 may be linked to equipment early warning systems such as the AAR early warning system. The AAR early warning system monitors railcar equipment, such as railcar wheels, and warns of potential equipment failures. In response to warnings from the AAR early warning system, a railcar owner may request a preemptive repair before the equipment fails. By interacting with such early warning systems, the billing verification system may automatically inform repair facilities of a customer's request for a preemptive repair. Similarly, the system may be configured to track customer requests for program repairs, such as repainting of a railcar. When the railcar arrives in a repair shop for an unrelated repair, the system can then notify the repair shop of the customer's program repair request.

The billing verification systems 100, 200 also may be configured to track the location and status of equipment being repaired. For example, a railcar repair billing verification system may interact with a railcar tracking system to provide information on the location of the railcar during repairs. In this manner, the system may notify a railcar owner if a railcar will be delayed or removed from service due to repairs. In a similar manner, the system also may track the time during which equipment is removed from service for repairs.

In addition, the billing verification systems 100, 200 may be configured to maintain historical archives of repairs performed by a variety of repair facilities. The system may make this information available to customers 102 to facilitate long-term audits of repairs done by all participating vendors 104.

One advantage of the billing verification systems 100, 200 described above is to provide for a standard environment for the exchange of shop maintenance information. For example, this environment may be standardized to provide a railcar owner with billing information both from railroad-owned repair facilities (subject to the AAR Interchange Rules) and independent repair facilities (not subject to the AAR Interchange Rules). Another advantage is to provide for a web-based interface that enables efficient communication channels between repair facilities, car owners, and car owner agents.

Operation of these billing verification systems 100, 200 will now be described with reference to FIGS. 3-13. Unless otherwise noted, the discussion will be applicable to both the billing verification system 100 of FIG. 1 and the billing verification system 200 of FIG. 2.

Figure 3:
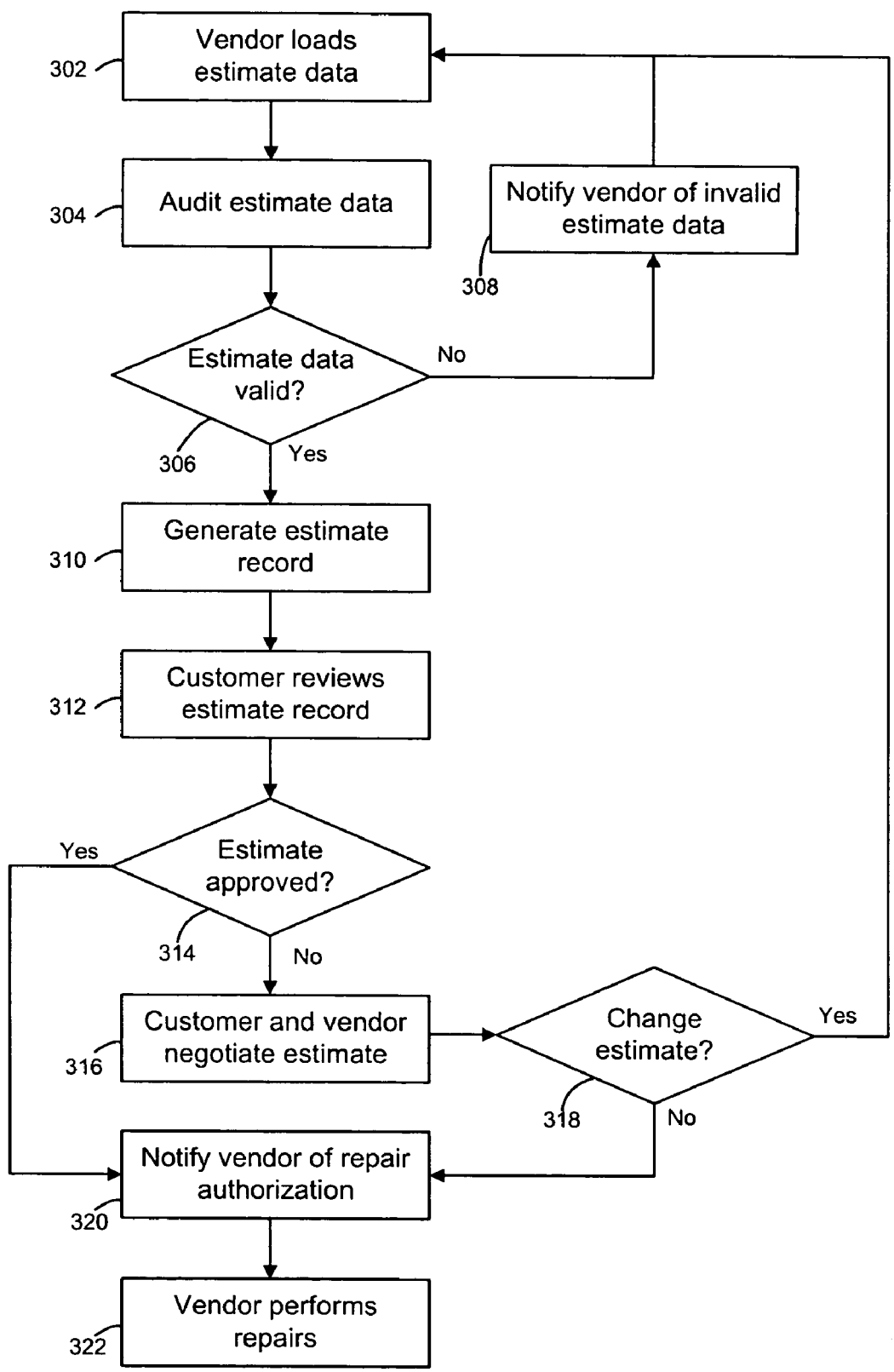
FIG. 3 shows a flow diagram illustrating a method of tracking and verifying estimates submitted by a vendor to a customer via a billing verification system according to another presently preferred embodiment of the invention.

The flowchart shown in FIG. 3 illustrates a method of tracking and verifying an estimate submitted by a vendor 104 to a customer 102 via a billing verification system 100, 200 according to another preferred embodiment of the invention. The following description of the method refers generally to customers 102 and vendors 104. Because the method is applicable to a wide variety of industries, the vendors 104 may represent parties that provide any of number of different products or services to the customers 102. The method involves a billing verification system 100, 200, as described above. For purposes of this method, the billing verification system 100, 200 may be controlled and operated by a customer 102, a vendor 104, or a third-party.

First, the vendor 104 loads estimate data into the billing verification system 100, 200 in step 302. For example, the vendor 104 preferably uploads the data in an electronic estimate file via a network 118. The estimate data may include a car identification number, the current location of the car, a description of the work to be performed, and the effective parts and labor rates. The estimate data also may include a unique work order number for shop tracking purposes.

The system 100, 200 then audits the estimate data in step 304. One purpose of this audit may be to identify formatting errors in the estimate data. This ensures that the data accepted and stored in the billing verification system 100, 200 maintains a consistent format. Another purpose of this audit may be to identify substantive errors in the estimate data, such as incorrect labor rates, etc. Based on this audit, the system determines in step 306 whether the estimate data is valid. If not, the system notifies the vendor of the invalid estimate data in step 308.

If the estimate data is valid, the system generates an estimate record based on the estimate data in step 310. The system may then notify the customer 102 that the estimate is available for review. For example, this notification may be via an electronic mail message generated by the billing verification system 100, 200 and sent to the customer 102. Alternatively, the customer 102 may be provided with the capability to access the records in the database 108 and search for pending estimates.

The customer reviews the estimate in step 312, preferably by accessing the server 106 via a network 112, 118. In step 314, the system determines whether the customer has approved the estimate. If so, the system notifies the vendor in step 320 that the customer 102 has authorized the repair. For example, this notification may be via an electronic mail message generated by the billing verification system 100, 200 and sent to the vendor 104. Alternatively, if the customer 102 rejects the estimate, then the customer 102 and the vendor 104 may negotiate the estimate in step 316. The system preferably facilitates this negotiation by providing for efficient communication between the customer 102 and the vendor 104. For example, the customer 102 may send a message to the vendor 104 via the billing verification system 100, 200 identifying specific exceptions to or concerns regarding the estimate. The vendor 104 may then send a responsive message to the customer 102 via the billing verification system 100, 200.

If the customer 102 and the vendor 104 reach agreement concerning the estimate, then it may be necessary to change the estimate. If so (step 318), then the vendor returns to step 302 and submits a new estimate. If no change to the original estimate is necessary as a result of the negotiation, then the customer 102 approves the estimate and the system notifies the vendor 104 of the repair authorization. For example, this notification may be via an electronic mail message generated by the billing verification system 100, 200 and sent to the vendor 104. The vendor 104 then proceeds with the repair.

Figure 4:
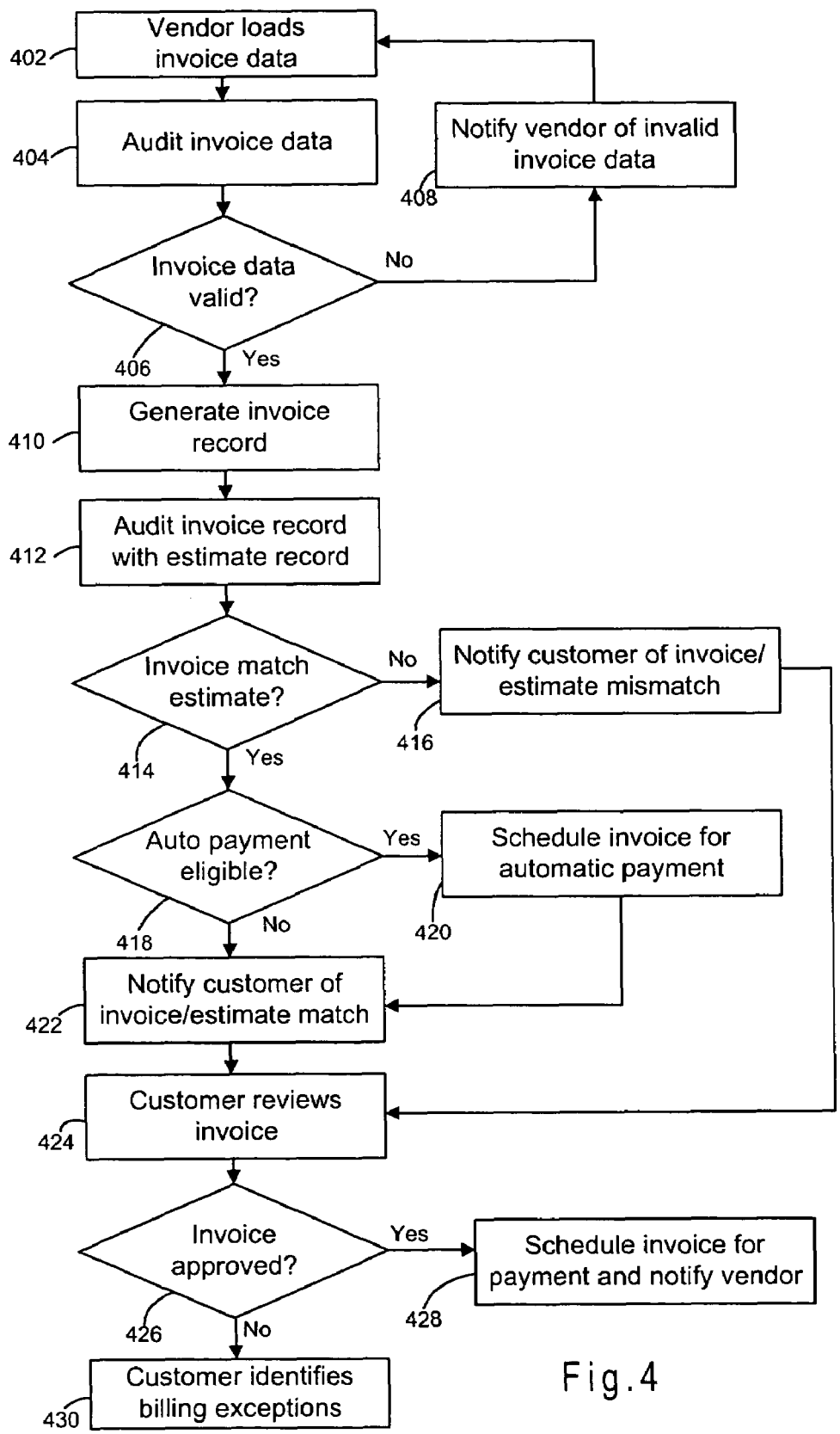
FIG. 4 shows a flow diagram illustrating a method of tracking and verifying invoices submitted by a vendor to a customer via a billing verification system according to another presently preferred embodiment of the invention.

After the vendor 104 has performed the repair, the vendor 104 may submit an invoice for the repair to the billing verification system 100, 200. The flowchart shown in FIG. 4 illustrates a method of tracking and verifying invoices submitted by a vendor 104 to a customer 102 via a billing verification system 100, 200 according to one preferred embodiment of the invention. Like FIG. 3, the following description of the method refers generally to customers 102 and vendors 104. Because the method is applicable to a wide variety of industries, the vendors 104 may represent parties that provide any of number of different products or services to the customers 102. The method involves a billing verification system 100, 200, as described above. For purposes of this method, the billing verification system 100, 200 may be controlled and operated by a customer 102, a vendor 104, or a third-party.

As shown in FIG. 4, the vendor 104 loads invoice data into the billing verification system 100, 200 in step 402. For example, the vendor 104 preferably uploads the data in an electronic invoice file via a network 118. The system 100, 200 then audits the invoice data in step 404. Like the initial estimate audit described above, one purpose of this audit may be to identify formatting errors in the invoice data. Another purpose of this audit may be to identify substantive errors in the estimate data, such as incorrect labor rates, etc. Based on this audit, the system determines in step 406 whether the invoice data is valid. If not, the system notifies the vendor of the invalid invoice data in step 408.

If the invoice data is valid, the system generates an invoice record based on the invoice data in step 410. The system 100, 200 then audits the invoice against the original estimate in step 412. Preferably, the system 100, 200 performs an automatic and detailed line-by-line audit to determine whether the invoice matches the estimate (step 414). If not, the system 100, 200 notifies the customer 102 that the invoice does not match the estimate. Alternatively, if the mismatch between the invoice and the estimate exceeds a minimum threshold, the system 100, 200 may notify the vendor 104 of the mismatch and require the vendor 104 to submit a corrected invoice (returning to step 402).

If the invoice matches the estimate, the system 100, 200 determines in step 418 whether the invoice is eligible for automatic payment according to preferences supplied by the customer. If so, the system schedules the invoice for automatic payment in step 420. For example, the system 100, 200 may interface with the customer's SAP system to schedule the invoice for payment according to the terms of a contract between the customer 102 and the vendor 104. In step 422, the billing verification system 100, 200 notifies the customer 102 that the invoice matches the estimate and is available for review.

Regardless of whether the invoice matches the estimate, the customer 102 optionally may review the invoice via the billing verification system 100, 200 in step 424, preferably by accessing the server 106 via a network 112, 118. In step 426, the system determines whether the customer has approved the estimate. If so, the system schedules the invoice for payment, as described above, and notifies the vendor in step 428. If the customer 102 does not approve the invoice, then the system 100, 200 enables the customer 102 to submit exceptions to the invoice in step 430, as described more fully below with respect to FIG. 5.

Figure 5:
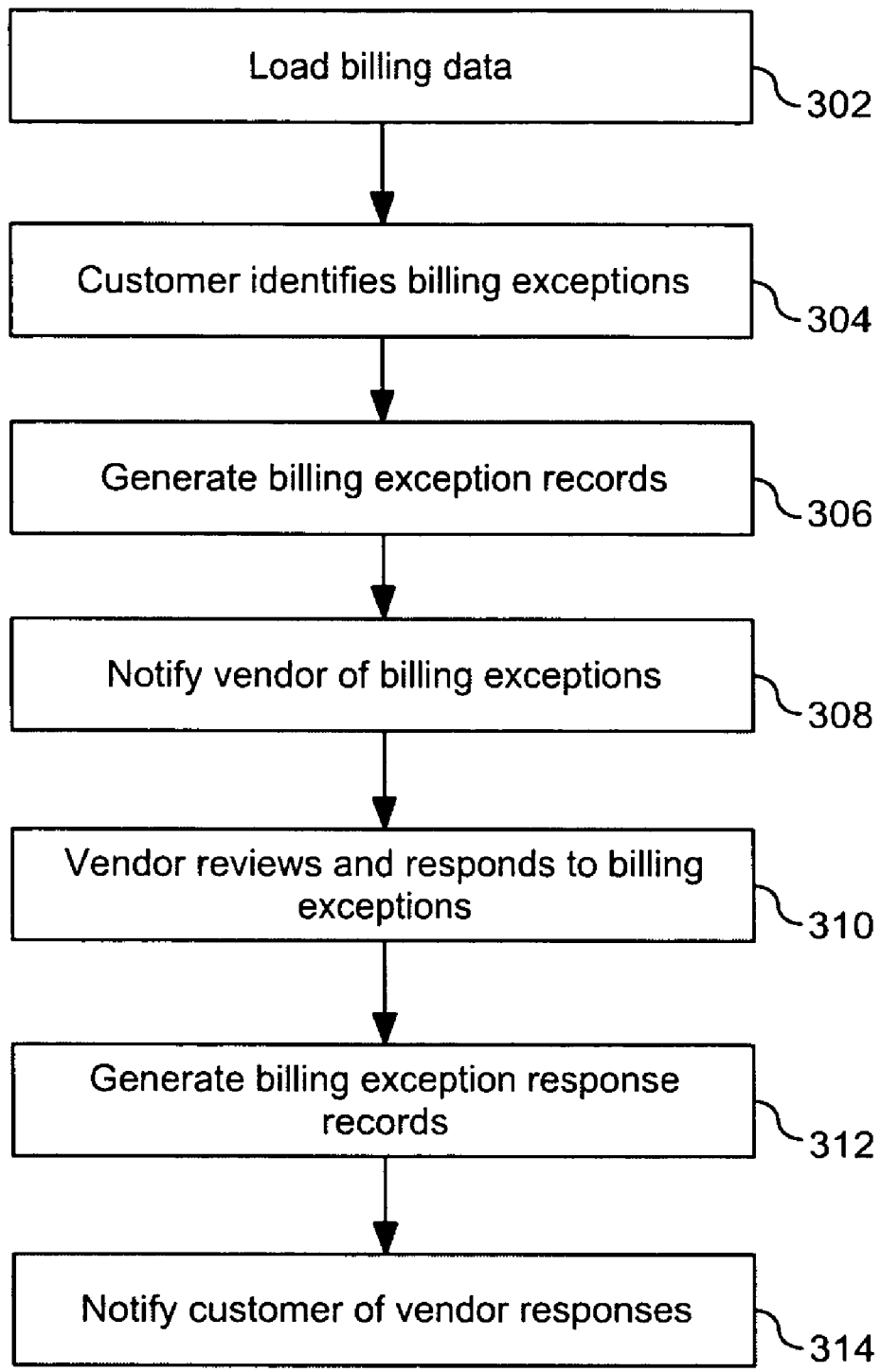
FIG. 5 shows a flow diagram illustrating a method of verifying charges billed by a vendor to a customer according to another presently preferred embodiment of the invention.

The flowchart shown in FIG. 5 illustrates a method of verifying charges billed by a vendor 104 to a customer 102 according to one preferred embodiment of the invention. The following description of the method refers generally to customers 102 and vendors 104. Because the method is applicable to a wide variety of industries, the vendors 104 may represent parties that provide any of number of different products or services to the customers 102. The method involves a billing verification system 100, 200, as described above. For purposes of this method, the billing verification system 100, 200 may be controlled and operated by a customer 102, a vendor 104, or a third-party.

First, billing data, such as invoice data, is loaded into the billing verification system 100, 200 in step 502. Depending on the format in which the billing data is provided by the vendor 104, the data may be loaded automatically from an electronic bill file or it may be entered manually from a hardcopy bill. For railroad-owned repair shops governed by the AAR Interchange Rules, this process generally takes place after payment of the invoices. Alternatively, for independent repair shops, billing data such as estimate and invoice data may be loaded into the billing verification system 100, 200 before payment, in the manner described above with respect to FIGS. 3 and 4.

The customer 102 then accesses the database 108 and reviews the billing data to identify any billing exceptions in step 504. Customer review of the billing data in step 504 may be performed manually by a customer audit representative, automatically by a computerized auditing system, or by a combination of both manual and automatic review. In addition, multiple customer employees, such as field representatives in remote locations, may access the billing verification system 100, 200 to review the billing data. In step 506, for each billing exception identified by the customer, the billing verification system 100, 200 generates a billing exception record in the database 108. The billing exception record may contain information identifying the bill to which an exception is taken, the amount of the exception, and the reasons justifying the exception. The vendor 104 is then notified of the customer's billing exceptions in step 508. Preferably, this notification is via an electronic mail message generated by the billing verification system 100, 200 and sent to the vendor 104.

The vendor 104 then accesses the database 108 and reviews the billing exception records in step 510 to identify acceptable billing exceptions. Like the customer review, vendor review may include review by a number of vendor employees, such as field representatives in remote locations. The vendor may approve, disapprove, or partially approve each billing exception. In each case, the billing verification system 100, 200 generates a billing exception response record in the database 108. The billing exception response record may contain information indicating whether the exception has been approved or disapproved, as well as a reason for the approval or disapproval. If the exception is partially approved, the billing exception response record also may include the partially approved dollar value. The billing verification system 100, 200 then notifies the customer of the vendor's billing exception responses in step 514. Like the vendor notification, customer notification preferably is via an electronic mail message generated by the billing verification system 100, 200 and sent to the customer.

In another preferred embodiment of the present invention, the billing verification system 100, 200 is used in the specific industry of railcar repair. In this embodiment, the billing verification system 100, 200 is used to process billing exceptions for railcar repair charges billed by a repair agent to a railcar equipment owner. The repair agent serves as a vendor 104 of repair services to its customer 102, the railcar owner. This embodiment of the invention, as viewed from the railcar owner's perspective, will now be discussed with reference to FIGS. 6-10.

Figure 6:
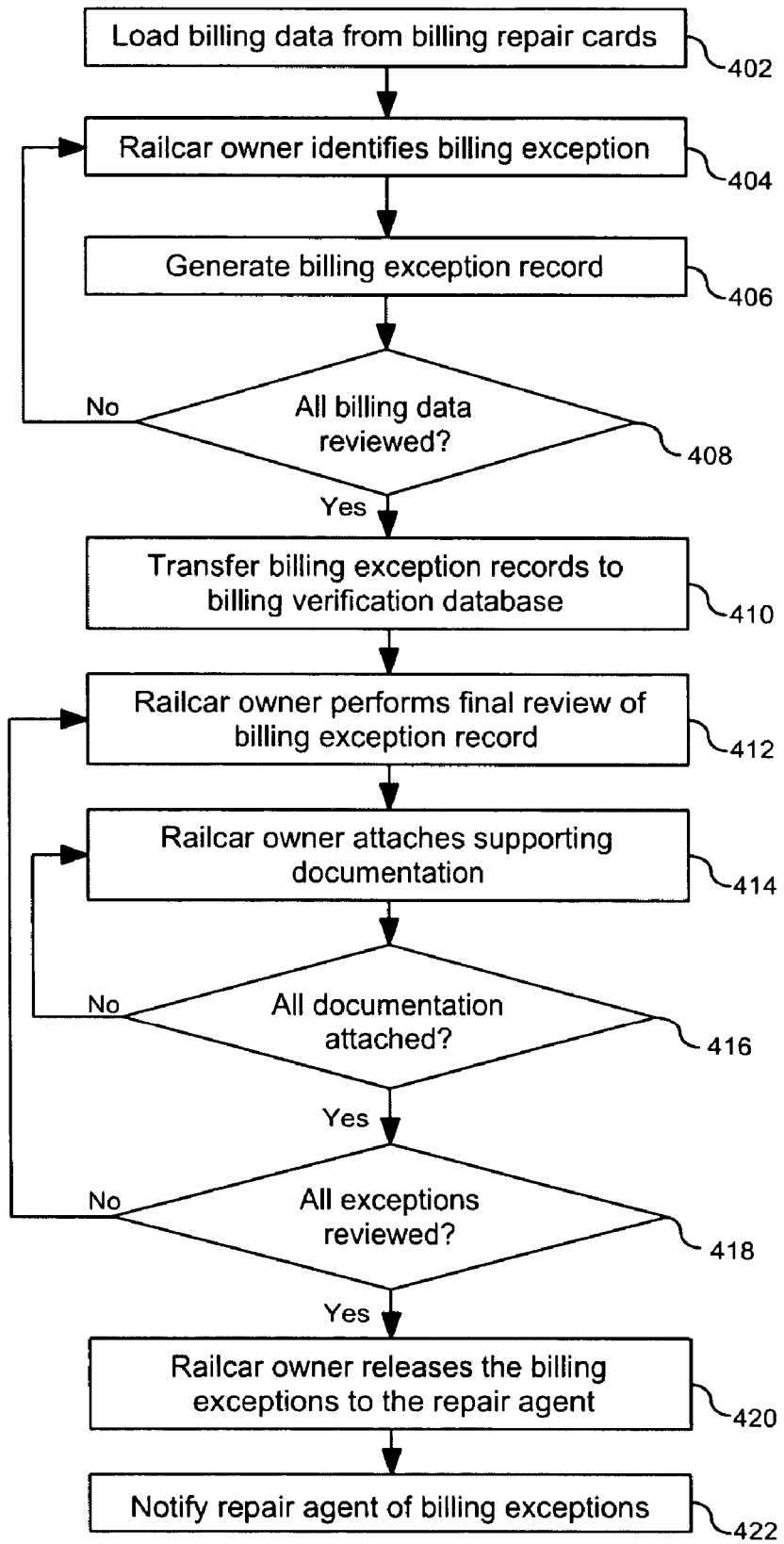
FIG. 6 shows a flow diagram illustrating, from an equipment owner's perspective, a method of verifying repair charges billed by a repair agent to the equipment owner according to another presently preferred embodiment of the present invention.

The flow diagram shown in FIG. 6 illustrates a transition method of verifying repair charges using both a mainframe accounting system 116 and the billing verification system 100, as described above with reference to FIG. 1. The method begins with the step 602 of loading billing data from billing repair cards into the mainframe accounting system 116. According to the AAR Interchange Rules, railroad-owned repair facilities provide billing data to railcar owners in the form of billing repair cards. A billing repair card indicates, among other things, the railcar number, the kind of car, the repair date and location, and description and cost of the necessary parts and labor. The format of billing repair cards is governed by the AAR Interchange Rules.

As described above, the billing data may be loaded into the mainframe accounting system 116 in a number of ways. For example, billing data may be loaded in the manner described above with respect to estimate and invoices in FIGS. 3 and 4. Alternatively, if billing repair cards or invoices are provided in hardcopy format, the railcar owner may manually enter the billing data via a data entry interface. If billing data is provided in an electronic file, it may be uploaded to the system automatically.

After the billing data is loaded into the mainframe accounting system 116, the railcar owner reviews the billing data for any incorrect, or disputed, repair charges in step 604. For each disputed repair charge identified in step 604, a billing exception record is generated in step 606. In step 608, the railcar owner determines whether all billing repair cards or invoices for a particular time period have been reviewed. If not, the railcar owner returns to step 604 to review the next billing repair card and/or invoice. Once the railcar owner has reviewed all billing repair cards and/or invoices, the method proceeds to step 610 in which the billing exception records are transferred to the billing verification system 100, 200.

Using the billing verification system 100, 200, the railcar owner may perform a final review of the billing exception records in step 612. The railcar owner accesses the billing verification system 100, 200 via a railcar owner graphical user interface. The graphical user interface displays information and allows the railcar owner to interact with the interface by using a pointing device to click on buttons and hypertext links. A similar graphical user interface is provided for the repair agent, as described more fully below.

An example of a railcar owner menu screen display 700 from an exemplary railcar owner graphical user interface is shown in FIG. 7. Under the Auditor Review section 702, the railcar owner may click on hypertext links to select and view billing exception records for various repair agents and time periods. The billing verification system 100, 200 may contain billing data for all repair agents that perform repairs for the railcar owner. Selecting billing exception records for a particular repair agent and a particular time period preferably causes the railcar owner graphical user interface to display a billing exception header screen display 800, an example of which is shown in FIG. 8. A header area 802 of the display 800 shows summary information relating to the billing repair cards and billing exceptions, including bill number, account date, received date, total bill amount, and total exception amount. A search area 804 provides options for selecting billing exception records that correspond to certain criteria, such as car number, exception amount, and repair location (SPLC). When the railcar owner clicks on the "SEARCH" button 806, the graphical user interface displays a billing exception record screen display 900, an example of which is shown in FIG. 9. A repair header area 902 of the display 900 shows, among other things, the railcar number, the date of repair, and the location at which the car was repaired. A repair description area 904 of the display 900 shows line item descriptions of the parts and labor required for the repair. Each repair line item begins with a repair line number that is used to reference billing exceptions. A billing exception area 906 of the display 900 shows exception line item descriptions of any exceptions to the repair charges. The exception line item begins with an exception line number that references the repair line number associated with the repair line item to which an exception is taken. For instance, in the display 900 of FIG. 9, an exception is shown for repair line item number seven, which is described as "LABOR, JACK CAR". The exception line item description indicates that an exception is taken because the repair agent provided no justification for jacking the car.

The repair header area 902, repair description area 904, and billing exception area 906 preferably are formatted in a manner that complies with the AAR Interchange Rules governing billing repair cards. A navigation area 908 is also included in the billing exception record screen display 900. By clicking the buttons in the navigation area 908, the railcar owner is able to navigate between different billing exception records.

If necessary, the railcar owner may attach electronic documentation to support an exception in step 614 of the method illustrated in FIG. 6. This may be accomplished by clicking the "MATL", "DUP", or "OTH" hypertext links in the appropriate exception line item of the exception area 906 shown in FIG. 9. Clicking these links causes the graphical user interface to display an exception document attachment screen display 1000, an example of which is shown in FIG. 10. The railcar owner locates and selects the document to be attached, or enters the location of the document in the path field 1002, and then clicks the attach button 1004. In this way, the railcar owner may attach emails, drawings, reports, and scanned documents to the exception line item. Preferably, the "MATL" hypertext link is used to attach copies of a materials requisition that show the railcar owner already paid for the parts billed. Similarly, when a repair agent inadvertently bills a railcar owner twice for the same repair, the "DUP" link may be used to attach copies of the duplicate billing repair card. The "OTH" link may be used to attach any other form of supporting documentation.

The hypertext links labeled "MATL", "DUP", and "OTH" in repair line item number seven of the repair description area 904 shown in FIG. 9 indicate that supporting documentation of all three forms has been attached to the billing exception record associated with that repair line item. Clicking on any of these three links causes the graphical user interface to display the corresponding attached documentation.

In step 616 of the method illustrated in FIG. 6, the railcar owner determines whether all necessary documentation has been attached to the billing exception record. If not, additional documentation is attached in step 614. Once all documentation has been attached, the method proceeds to step 618, in which it is determined whether all billing exception records have been reviewed. If not, the railcar owner returns to step 612 to review the next billing exception record. Once all billing exception records have been reviewed, the railcar owner releases the billing exception records to the repair agent in step 620 by clicking on the "RELEASE" button 608 shown in the billing exception header screen display 800 of FIG. 8. Until this time, the billing exception records are not accessible by the repair agent. Once released in step 620, however, the billing exception records become available to the repair agent via the billing verification system 100, 200, and the repair agent is notified of their availability in step 622. Preferably, the billing verification system 100, 200 provides notification by generating an electronic mail message and sending the message to the repair agent.

The preceding discussion addressed a transition method of verifying railcar repair charges from the railcar owner's perspective. The transition method is useful for railcar owners as they transition from processing billing exceptions via a mainframe accounting system 116 to processing exceptions solely via a billing verification system 100, 200. Once a railcar owner has completely transitioned to the billing verification system 100, 200, the method illustrated in FIG. 6 may be simplified. The first simplification is that steps 602 through 608 may be performed via the billing verification system 100, 200 rather than the mainframe accounting system 116. As a result, the billing data from the billing repair cards may be entered directly into the billing verification system 100, 200, and the billing exception records may be created directly in the database 108. In addition, the repair agent optionally may upload the billing data from an electronic file directly to the billing verification system database 108. The second simplification is that step 610, transferring the billing exception records from the mainframe accounting system 116 to the database 108, becomes unnecessary. In addition to these simplifications, transitioning completely to the billing verification system 100, 200 enables multiple customer employees, such as field representatives in remote locations, to review the billing data and identify disputed charges by accessing the billing verification system 100, 200.

The method of verifying railcar repair charges will now be described from the repair agent's perspective with reference to FIGS. 11-15. After the billing verification system 100, 200 sends notification to the repair agent that the billing exception records are available, the repair agent accesses the billing verification system 100, 200 in step 1102. A repair agent graphical user interface presents the repair agent with a repair agent menu screen display 1200, such as the example shown in FIG. 12. From this display 1200, the repair agent may select billing exception records relating to a particular railcar owner and time period by clicking on the appropriate hypertext link. The billing verification system 100 of FIG. 1 contains only one railcar owner's billing exception records. The billing verification system 200 of FIG. 2, however, may contain billing exceptions records for all railcar owners for which the repair agent performs repairs.

Figure 11:
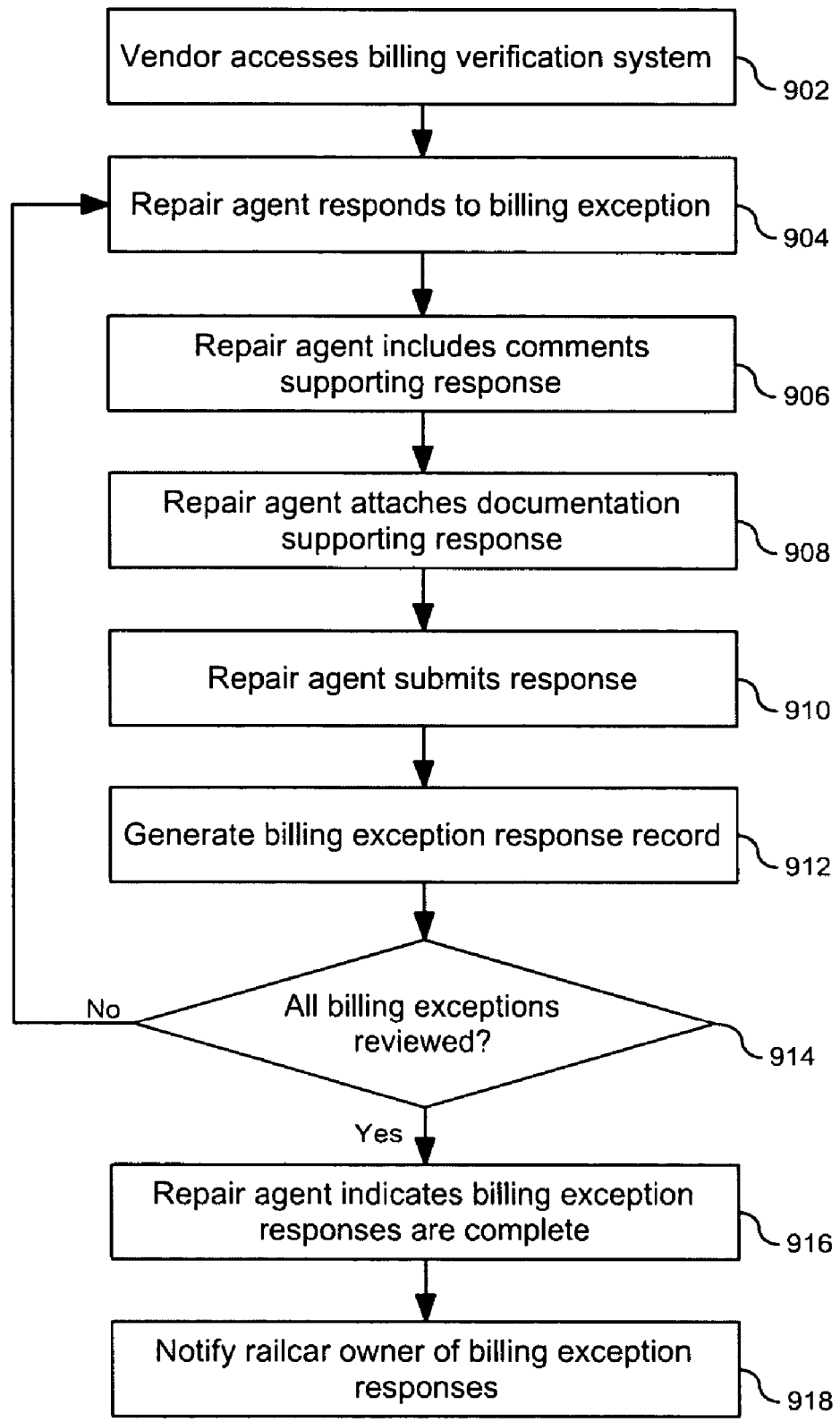
FIG. 11 shows a flow diagram illustrating, from a repair agent's perspective, a method of verifying repair charges billed by the repair agent to an equipment owner according to another presently preferred embodiment of the present invention.

After the repair agent clicks one of the hypertext links relating to a particular railcar owner and a particular time period in the repair agent menu screen, the graphical user interface presents a billing exception record header screen display 1300, an example of which is shown in FIG. 11. A header area 1302 of the display 1300 displays information such as the bill number, a control number field 1304, account date, received date, total bill amount, total exception amount, and total CBA amount. A search area 1306 provides options for selecting billing exception records that correspond to certain criteria, such as car number, exception amount, and repair location (SPLC). When the repair agent clicks on the "SEARCH" button 1308, the graphical user interface displays the first billing exception response screen display 1400, an example of which is shown in FIG. 12.

A header area 1402 of the display 1400 shows, among other things, the railcar number, the date of repair, and the location at which the car was repaired. A billing exception area 1404 of the display 1400 shows a line item description of the exception. The exception line item begins with an exception line number that references the repair line number associated with the repair line item on the original billing repair card to which an exception is taken. The display 1400 also includes a repair agent response area 1406 in which the repair agent may select a response to the exception. Preferably, the repair agent is presented with three possible responses. The repair agent may allow the exception, disallow the exception, or partially allow the exception. If the exception is partially allowed, the repair agent must designate a partially allowed exception amount. The repair header area 1402, billing exception area 1404, and repair agent response area 1406 preferably are formatted in a manner that complies with the AAR Interchange Rules governing billing repair cards.

Also within the response area 1406, the repair agent may include comments supporting or explaining the response (step 1106 of the method illustrated in FIG. 11). This is accomplished by clicking on the "COMMENTS" hypertext link, which causes the graphical user interface to display a response comments box 1502, and example of which is shown in the comments screen display 1500 of FIG. 15. The comments are added to the "COMMENTS" field in the response area 1406 of FIG. 14 after the repair agent clicks the "ADD" button 1504 in the response comments box 1502. The repair agent optionally may attach supporting documentation in step 1108 in a manner similar to that in which the railcar owner attaches supporting documentation as described above.

Figures 16, 17:
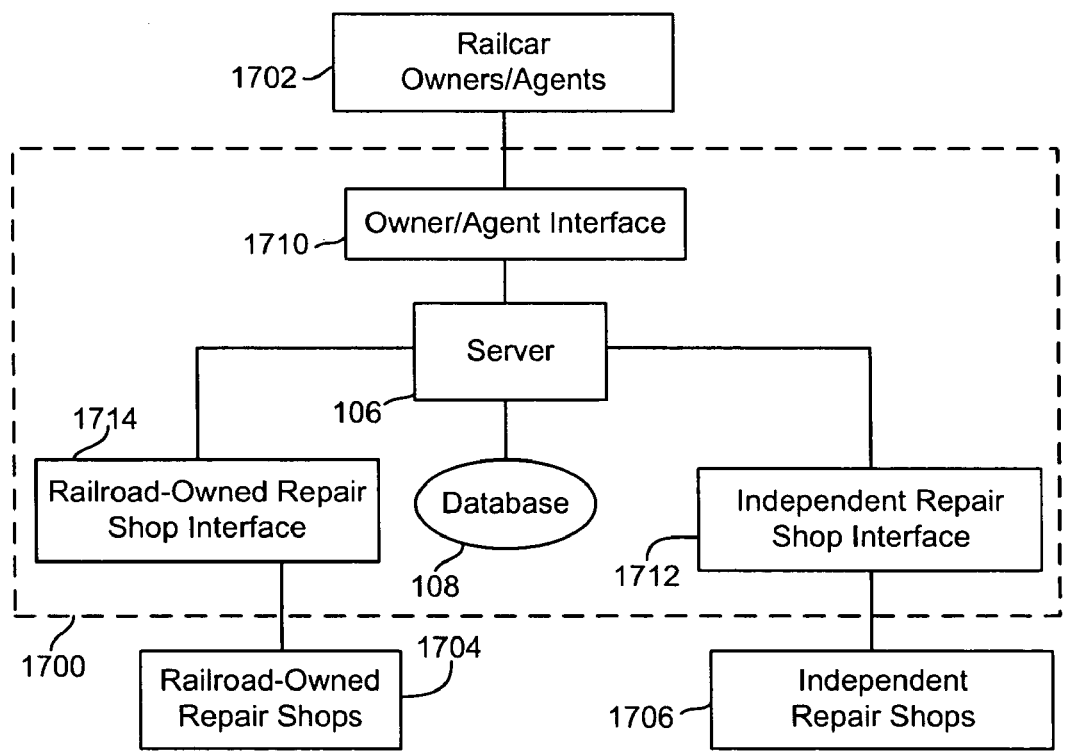
FIG. 16 shows a summary report screen display from the repair agent graphical user interface.
FIG. 17 shows a block diagram depicting a billing verification system according to another presently preferred embodiment of the invention.

The billing verification system 100, 200 may accommodate varying levels of review by different representatives of the repair agent. This is particularly useful because field representatives of the repair agent may need to be consulted to confirm certain information related to repairs that were performed in the field. The level of review for different repair agent representatives is governed by the authentication and access control procedure. For instance, a repair agent manager and various repair agent field representatives may be granted different authentication credentials, such as usernames and passwords. Based on these credentials, the authentication and access control procedure preferably grants the manager access to all billing exception records relating to the repair agent. The field representatives, however, are preferably only granted access to those billing exception records that relate to their particular field repair facility or category of appropriate repair. In this case, the manager may notify each field representative when the billing exception records are available for their review. The field representatives then notify the manager when they have completed their review. Alternatively, the billing verification system 100, 200 may generate the appropriate notification messages. Once a field representative has completed review of billing exceptions and prepared the appropriate responses, those billing exception records may become inaccessible to the field representative, although the repair agent manager still may access them. At any time, the manager may review the status of pending billing exceptions according to various categories, such as completed responses, field-completed responses, and in-process responses. For instance, the manager may review an exception processing status report screen display 1600, an example of which is shown in FIG. 16, by clicking the "STATUS RPT" button on the exception record header screen display 1300 of FIG. 11. The display 1600 includes a processing summary area 1602 that indicates how many of the exceptions for each location (SPLC) have been completed, how many have been field-completed, and how many are currently in-process. The summary area 1602 also includes information regarding the dollar amounts of the exceptions that have been allowed, disallowed, and partially allowed. Preferably, the manager reviews all billing exception responses before they are released to the railcar owner, as described below.

In step 1110 of the method illustrated in FIG. 11, the repair agent submits the exception response by clicking either the "SUBMIT" button 1408 or the "SUBMIT/NEXT" button 1410 on the billing exception response screen display 1400. The "SUBMIT/NEXT" button 1410 also causes the graphical user interface to display a billing exception response screen for the next billing exception to be reviewed. After the repair agent clicks on either of these two buttons, the billing verification system 100, 200 generates a billing exception response record in the database 108 (step 1112 of the method illustrated in FIG. 11). It will be understood in the art that the billing exception response record may be an independent database record or it may be contained within the corresponding billing exception record.

The next step 1114 is to determine whether the repair agent has reviewed all billing exception records. If not, the method returns to step 904, in which the repair agent reviews the next billing exception record in the same manner as described above. Once the repair agent has reviewed all of the billing exception records for a particular railcar owner and time period, the repair agent completes the exception review process in step 1116 by clicking the "COMPLETED" button on the exception header review screen display 1300 of FIG. 13. The railcar owner is then notified of the billing exception responses in step 1118. At this time, the billing exception response records become available for review by the railcar owner. The railcar owner accesses the billing exception response records via the "RAILROAD COMPLETED" hypertext link 704 on the railcar owner menu screen display 700 shown in FIG. 7.

Preferably, before the railcar owner is notified that the billing exception response records are available for review, the repair agent designates a control number, or credit billing authority number, to be associated with the bill and its corresponding billing exceptions. For instance, the repair agent may designate a control number in the control number field 1304 of the billing exception header screen 1300 shown in FIG. 13. The repair agent may update the control number by clicking the "UPDATE CBA" button 1310. The railcar owner then uses this control number to take a credit on its repair charge account with the repair agent or to counter-bill the repair agent in accordance with the credit billing authority procedures provided by the AAR Interchange Rules. For example, the billing verification system 100, 200 may generate a message that is sent to the railcar owner's accounts payable system 114 indicating that the appropriate credit may be deducted from the next bill paid to that repair agent.

If necessary, the methods described above may include a number of review iterations by both the customer (i.e. railcar owner) and the vendor (i.e. repair agent). For instance, if a vendor disapproves a customer's billing exception, the customer may reply with further documentation supporting the exception. The vendor may then provide an additional response. This iterative process may continue until all disputed charges are resolved.

FIG. 17 shows a block diagram depicting a billing verification system 1700 according to another aspect of the invention. Like the billing verification systems 100, 200 described above, the billing verification system 1700 illustrated in FIG. 17 includes a server 106 and a database 108. The billing verification system 1700 also includes three functional interfaces for communicating with three different types of entities: railcar owners/agents 1702, railroad-owned repair shops or facilities 1704, and independent repair shops or facilities 1706. These three separate interfaces facilitate the different types of data and interactions shared between the different types of entities and the billing verification system 1700. The railroad-owned repair facility interface 1714 enables railroad-owned repair facilities to submit and manage billing repair cards and billing exceptions in accordance with the AAR Interchange Rules, as described above. The independent repair facility interface 1712 enables independent repair facilities to submit and manage repair estimates and invoices, as well as to track and manage customer billing exceptions, as described above. Finally, the railcar owner interface enables railcar owners to use a single interface for tracking, verifying, and managing billing data both from railroad-owned repair shops (in accordance with the AAR Interchange Rules) and from independent repair shops.

The railroad-owned repair facility interface 1714 and the independent repair facility interface 1712 may be similar in many respects, based on the similarities in types of interaction between each type of repair facility 1704, 1706 and the billing verification system 1700. For example, both interfaces 1712, 1714 are configured to provide a given repair shop with access to billing exception records related to repairs performed by that shop. Indeed, the two interfaces 1712, 1714 may be exactly the same in practice. However, it generally is not necessary for railroad-owned repair facilities 1704 to submit an estimate before performing a repair, so the railroad-owned repair facility interface 1714 need not include this feature. The independent repair facility interface 1712, however, includes this feature, however, because independent repair facilities 1706 typically are required to submit an estimate before performing a repair.

Because of the variation between the AAR Interchange Rules, which govern billing by railroad-owned repair facilities, and the private contracts that govern billing by independent repair facilities, the integrated railcar owner/agent interface provides a significant benefit to railcar owners. It enables railcar owners to manage repair billing for all of their railcars with one system, regardless of which type of repair facility performed the repair.

It is intended that the foregoing detailed description be regarded as illustrative rather than limiting, and that it be understood that the following claims, including all equivalents, are intended to define the scope of this invention.

The invention claimed is:

1. A system for tracking and verifying charges billed to a railcar owner by a plurality of railcar repair facilities, including a plurality of railroad-owned railcar repair facilities and a plurality of independent railcar repair facilities, comprising:

a server configured to receive billing data received from the plurality of railcar repair facilities;

a database in communication with the server and configured to store the billing data;

a railroad-owned repair facility graphical user interface configured to provide communication between the server and the plurality of railroad-owned repair facilities;
an independent repair facility graphical user interface configured to provide communication between the server and the plurality of independent repair facilities; and
a railcar owner graphical user interface configured to provide communication between the server and the railcar owner;
wherein the railcar owner interface is further configured to provide the railcar owner with access to billing data received both from at least one of the railroad-owned repair facilities and from at least one of the independent repair facilities.

2. The system of claim 1, wherein the billing data includes:
estimate data, invoice data, and billing exception data related to independent repair facilities; and
invoice data and billing exception data related to railroad-owned repair facilities.

3. The system of claim 1, further comprising:
an interface to an early warning system, wherein the interface is configured to notify one or more of the railcar repair facilities of a repair required by the early warning system.

4. The system of claim 1, further comprising:
an interface to a railcar tracking system, wherein the interface is configured to provide the railcar owner with information concerning the location of its railcars.

5. The system of claim 1, further comprising:
an interface to a customer accounts payable system, wherein the interface is configured to schedule payment of an invoice after the railcar owner approves the invoice.

6. The system of claim 1, wherein the railcar owner graphical user interface further comprises a plurality of displayed railcar repair billing exception data, including railcar numbers, exception amounts, and repair locations, for repairs performed by at least one of the plurality of railroad-owned railcar repair facilities and at least one of the plurality of independent railcar repair facilities.

7. The system of claim 4, wherein the railcar tracking system interface is further configured to notify the railcar owner of a railcar delay resulting from a railcar repair.

8. The system of claim 1, wherein the railcar owner graphical user interface further comprises a railcar repair search area for selecting an exception record that corresponds to a particular railcar.

9. A computer-implemented method for tracking and verifying charges billed to a railcar owner by a plurality of railcar repair facilities, including a plurality of railroad-owned railcar repair facilities and a plurality of independent railcar repair facilities, comprising:
receiving, via a first storage medium, railroad-owned repair facility billing data from the plurality of railroad-owned railcar repair facilities via a railroad-owned repair facility graphical user interface displayed on a first workstation;
transferring the railroad-owned repair facility billing data to a database;
receiving, via a second storage medium, independent repair facility billing data from the plurality of independent railcar repair facilities via a independent railcar repair facility graphical user interface displayed on a second workstation;
transferring the independent repair facility billing data to the database;
providing a railcar owner with access via a railcar owner graphical user interface displayed on a third workstation to:
the railroad-owned repair facility billing data from at least one of the railroad-owned repair facilities; and
the independent repair facility billing data from at least one of the independent railcar repair facilities.

10. The method of claim 9, wherein:
the railroad-owned repair facility graphical user interface includes a plurality of custom railroad-owned repair facility web pages displayed on the first workstation;
the independent repair facility graphical user interface includes a plurality of custom independent repair facility web pages displayed on the second workstation; and
the railcar owner graphical user interface includes a plurality of custom railcar owner web pages displayed on the third workstation.

11. The method of claim 9, further comprising:
receiving, via a billing verification system, a warning of potential railcar failure from an early warning system via an electronic early warning system interface; and
automatically generating, via the billing verification system, a request for preemptive railcar repair in response to the potential railcar failure warning.

12. The method of claim 11, further comprising:
automatically notifying at least one of the plurality of railroad-owned repair facilities of the preemptive railcar repair request via the railroad-owned repair facility graphical user interface displayed on the first workstation.

13. The method of claim 11, further comprising:
automatically notifying at least one of the plurality of independent repair facilities of the preemptive railcar repair request via the independent repair facility graphical user interface displayed on the second workstation.

14. The method of claim 9, further comprising:
receiving a request for program railcar repairs from the railcar owner via the railcar owner graphical user interface displayed on the third workstation.

15. The method of claim 14, further comprising:
automatically notifying at least one of the plurality of railroad-owned repair facilities of the program railcar repair request via the railroad-owned repair facility graphical user interface displayed on the first workstation.

16. The method of claim 14, further comprising:
automatically notifying at least one of the plurality of independent repair facilities of the program railcar repair request via the independent repair facility graphical user interface displayed on the second workstation.

17. The method of claim 9, further comprising:
receiving, via the billing verification system, a notification of railcar repair from one of the plurality of railcar repair facilities; and
automatically notifying the railcar owner, via the railcar owner graphical user interface displayed on the third workstation, of a railcar delay resulting from the railcar repair.

18. The method of claim 17, wherein:
the railcar repair notification is received from one of the plurality of railroad-owned repair facilities via the railroad-owned repair facility graphical user interface displayed on the first workstation.

19. The method of claim 17, wherein:
the railcar repair notification is received from one of the plurality of independent repair facilities via the independent repair facility graphical user interface displayed on the second workstation.

20. The method of claim 9, further comprising:
receiving a railcar repair estimate from one of the plurality of independent railcar repair facilities via the independent railcar repair facility graphical user interface displayed on the second workstation;
automatically notifying the railcar owner of the railcar repair estimate via the railcar owner graphical user interface displayed on the third workstation;
receiving a repair authorization based on the railcar repair estimate, wherein the authorization is received from the railcar owner via the railcar owner graphical user interface displayed on the third workstation; and
automatically notifying the independent railcar repair facility of the repair authorization from the railcar owner, wherein the notification is provided via the independent railcar repair facility graphical user interface displayed on the second workstation.

* * * * *